May 1, 1956  B. M. ARMSTRONG  2,743,810
IDLER ROLLER FOR ENDLESS FLEXIBLE BELT CONVEYORS
Filed Aug. 25, 1951
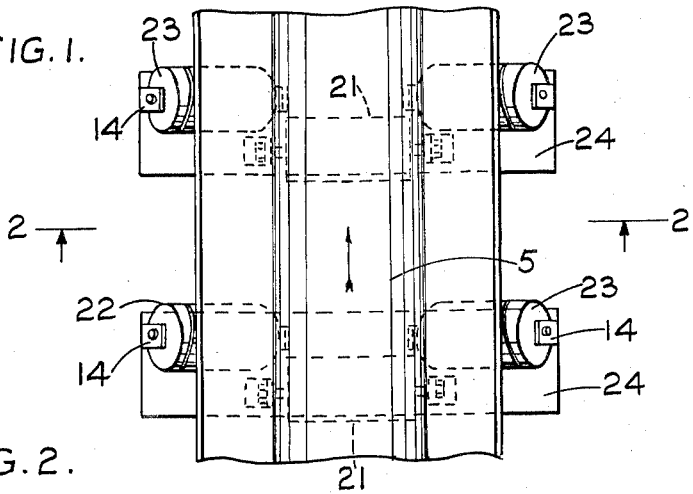
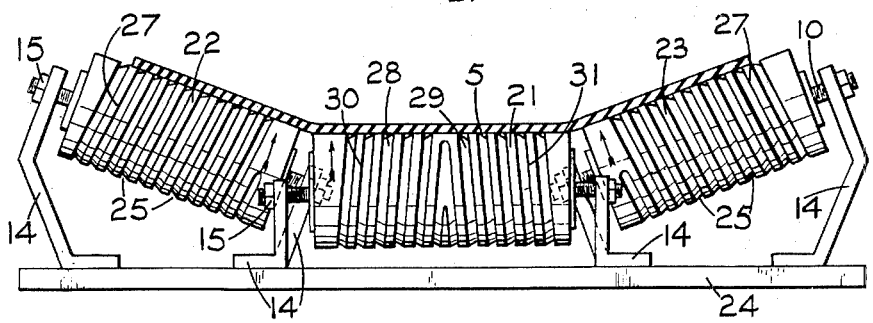
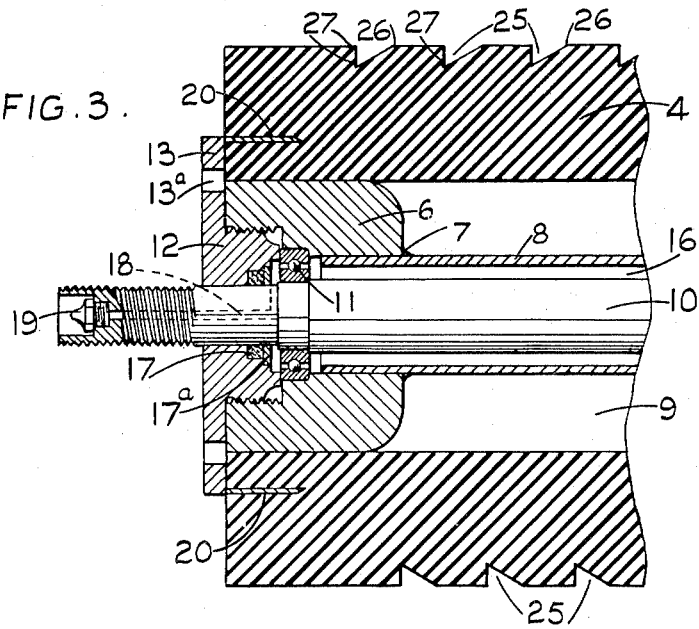
INVENTOR
Bernard Martin Armstrong
A. John Michel
BY  Attorney.

United States Patent Office 2,743,810
Patented May 1, 1956

2,743,810

IDLER ROLLER FOR ENDLESS FLEXIBLE BELT CONVEYORS

Bernard Martin Armstrong, Newnham-on-Severn, Great Britain, assignor to Conveying Developments Limited, Cardiff, Wales, Great Britain, a British company Application August 25, 1951, Serial No. 243,677

Claims priority, application Great Britain April 1, 1949

6 Claims. (Cl. 198—192)

This invention relates to endless flexible belt conveyors. This application is a continuation in part application of my application entitled "Improvements in or relating to endless flexible belt conveyors," Serial No. 152,150, filed March 27, 1950, and now abandoned.

The invention is intended for application to such conveyors in which material or other load to be conveyed drops by gravity on to the conveyor belt so that the belt is subjected to substantial impact at the position at which the load is received. In such conveyors it is necessary to support the load carrying run of the belt adjacent the load receiving position by means of one or more idler rollers so as to minimize the risk of the belt tearing or otherwise failing under the heavy load to which it may be suddenly subjected.

Such conveyors may be used, for example, in coal mines and a particular example is those conveyors which run parallel to the coal face which is being mined and on to which lumps of coal are dropped or thrown so as to fall by gravity on to the belt.

A further example of conveyors in coal mines where the load falls suddenly by gravity on to the load carrying run of a conveyor belt are the transfer points where the load is transferred from one conveyor belt to the next.

For instance, the conveyor adjacent the coal face is usually arranged so that one end thereof extends transversely above a second conveyor, the coal falling off the end of the face conveyor by gravity on to the load carrying run of the second conveyor extending transversely therebelow, and from one end of this second conveyor the coal may again fall by gravity on to a succession of further similarly relatively arranged conveyors for the purpose of conveying the coal to the shaft up which the coal is hoisted.

At each of the transfer positions between two conveyor belts the coal falling on the belt of the lower conveyor subjects the belt of such conveyor to a substantial impact and the same applies in the case of the conveyor which receives the coal from the coal face.

As hitherto constructed the idler rollers which support the belt at these load receiving positions have been in the form of a rigid metal cylinder, the outer periphery of which metal cylinder either engages directly with the under surface of the belt, or in some instances is provided with an external sleeve of solid rubber, the inner periphery of which engages with the metal cylinder over the entire length of the sleeve and the outer periphery of which engages with the belt.

In either arrangement the periphery of the idler roller assembly which engages with the belt is respectively of rigid or substantially rigid form so that when the load falls on the belt the resultant impact is absorbed in fracture or disintegration of the load and in deformation and crushing of the material of the belt itself which is instantaneously between the load and the roller, so that the fibres of the material forming the belt are damaged, and after a comparatively short time substantial damage to the belt is apparent with the result that the effective life of the belt is relatively limited.

These difficulties although arising in particular in coal mining operations, arise also in other circumstances where material is fed by gravity on to an endless belt, for example, in the handling of iron ore, or in quarrying operations and so forth.

The serious damage which occurs to the belt in the manner above indicated is of prime importance because conveyor belts, particularly those of any important size are extremely expensive and their frequent replacement or repair, apart from loss in production involves a substantial financial outlay, but the damage which may occur to the load itself may also be significant, for example, in coal mining operations where disintegration of the coal into pieces of an unduly small size is very undesirable and uneconomic.

The present invention has for its primary object the provision of an improved form of idler roller for use in supporting the load carrying run of an endless flexible belt conveyor at a load receiving position whereby the foregoing disadvantages of existing constructions of endless belt conveyors are avoided.

The invention is further applicable to endless flexible belt conveyors as above described which are of trough form in cross section. In such conveyors it is common practice to support the load carrying run of the belt upon pairs of idler rollers the axes of which are oppositely inclined to the horizontal so as to obtain the desired troughing of the conveyor belt.

In such conveyors the belt is liable to be subjected locally to forces tending to displace it laterally in relation to the idler rollers.

Such forces may arise through improper alignment of positioning of the belt supporting structure, alternatively, they may arise from a load delivered externally to the belt in a lateral direction, for example, from a load received from one end of a second endless belt conveyor disposed above and transversely with respect to the conveyor which is receiving the load.

In consequence of this tendency for the belt to move laterally locally along its length, the edge of the belt may foul the supporting structure or spillage of the material may occur, and a further object of the present invention is the provision of an improved construction in which such lateral displacement can effectively be prevented.

Further objects of the invention will be apparent from the following description and claims and from the drawings accompanying the specification, wherein:

Figure 1 is a plan view of a portion of the load carrying run of a conveyor belt, incorporating two sets of idler rollers constructed according to the invention.

Figure 2 is a sectional view taken on the line 2—2 of Figure 1, to an enlarged scale.

Figure 3 is a fragmentary longitudinal sectional view showing one end of an idler roller constructed according to the invention.

Referring to the drawings, which illustrate one construction as applied to an idler roller for an endless belt conveyor for use in coal mines in the general manner above described wherein the idler roller is to support the belt at those positions at which the belt receives an impacting load, each roller comprises a hollow wall member 4 formed of solid rubber. I find that a suitable radial wall thickness for the wall member 4 is one between ¾" and 2" and that a convenient axial length for the wall member is between 10" and 16". A convenient external diameter for the member 4 is 6". The exact external diameter and axial length of each wall member 4 would be dependent upon the width of the conveyor belt which is illustrated at 5 in the drawing.

Each end of the wall member 4 has mounted therein a cylindrical bush 6 which is a tight fit within the interior of the end of the wall member and is bonded to the interior surface thereof so as to provide an effective air-tight seal between the periphery of each bush and the interior of the member 4.

Extending within the interior of the inner end portion of each bush 6 and welded thereto at 7 is a cylindrical sleeve 8 which extends continuously between the two bushes so that in between this sleeve and the interior of the member 4 is provided an annular air space 9. Such air space 9 is not specially inflated in any way to a pressure above that of the surrounding atmosphere being merely sealed off from both the surrounding atmosphere and the interior of the sleeve 8 during the operation of assembling the parts so far described.

Extending through the interior of the sleeve 8 in spaced relationship therewith and projecting beyond the opposite ends of each bush 6 is a central shaft 10 on which the two bushes 6 are mounted rotatably through the medium of an anti-friction bearing 11 disposed within a recessed part of the interior of each bush 6. Each bearing is secured in position by a peripherally threaded cap 12 which engages with a correspondingly threaded part formed in the interior of the outer end of each bush. The outer end of each cap is peripherally flanged at 13, the flanged part being provided with turning holes 13a.

Each roller assembly constructed as above described is supported by mounting each shaft 10 in mounting brackets 14 as by nuts 15 (see Figure 2).

By reason of the clearance between the interior of the sleeve 8 and the shaft 10 an annular space 16 is provided between these parts which serves to contain grease or other lubricant for lubricating each bearing 11, and escape of this lubricant between each end of the shaft 10 and the adjacent cap 12 is prevented by the provision of felt and metal washers 17, 17a respectively which are housed within a recessed part in each cap 12. The two washers are spaced axially from the adjacent bearing 11, the space therebetween communicating with one end of a lubricant passage 18 provided in the interior of each shaft end, the outer end of the passage 18 being provided with a grease nipple 19, the arrangement permitting of each bearing 11 and space 16 being re-charged with lubricant from time to time as required.

Each bush 6 is of rigid configuration and in consequence thereof I have found that when the adjacent ends of the member 4 are subjected to substantial impact in the manner above described, there is a tendency for such member to become loosened in relation to each of the bushes 6 so that it is no longr properly supported by the same, while there is a danger that the air-tight seal between each bush and the interior of the member 4 may be destroyed. In order to avoid the possibility of this undesirable effect, opposite ends of each member 4 are reinforced internally by an annular reinforcing member 20 in the form of a thin cylindrical metal band of internal diameter appreciably larger than the internal diameter of the roller member and of external diameter appreciably smaller than the external diameter of such member, such band being inserted symmetrically and axially into each end of the member 4, and being retained in such position by the cap flange 12 which abuts against the outer end of the band 20 when this is flush with the adjacent end wall of the member 4. In such an arrangement a cushion of resilient material is provided between the outer periphery of the band 20, and the outer periphery of the member 4, as well as between the inner periphery of the band, and the inner periphery of the member 4 adjacent to the said bush so that deformation of the reinforcing band itself under sudden impact as above described is avoided, and at the same time I have found that by the provision of such reinforcing band the end of the member 4 is maintained tightly secured to the bush aforesaid.

Rollers constructed as above described would be mounted at each of the load receiving positions of a conveyor belt and conveniently a plurality of such rollers (namely three rollers in the arrangement illustrated) are disposed across the width of the belt so that the conveyor belt is supported at intervals along its length by sets of three idler rollers, each set comprising a horizontal central roller indicated at 21 which supports the medial portion of the belt 5, with the other two rollers 22, 23 respectively disposed at opposite ends of this horizontal roller with their axes inclined to the horizontal to support the belt with its edge portions raised above the medial portion, all three rollers being mounted for rotation through the medium of the brackets 14, which brackets are affixed to a common base plate 24.

The inclined rollers 22, 23 are each formed with a peripheral groove 25 of unsymmetrical, namely, wedge shape in cross section as seen most clearly in Figure 3 so that one edge 26 of each groove is relatively smooth and does not resist significantly lateral movement of the belt in either direction in relation to the roller. The other edge 27 of the groove extends substantially radially in relation to the roller axis so as to be relatively sharp.

The helical grooves 25 on the two rollers 22, 23 are of opposite hand with the sharp edge 27 aforesaid of each groove directed towards the longitudinal centre line of the belt so that these edges 27 by reason of their relatively sharp configuration serve to resist lateral movement of the adjacent part of the belt in relation to each roller 22, 23 in a direction away from the longitudinal centre line of the belt.

Furthermore, the hand of the helical groove on each roller 22, 23 is such that for the normal direction of travel of the belt, as indicated by the arrows in Figures 1 and 2, the relatively sharp edges 27 of the helical grooves as they approach the position of contact with the belt are in effect in the case of each roller 22, 23 being displaced towards the longitudinal centre line of the belt so as to apply a reaction force to the belt as they engage with its under side acting in a direction tending to displace the adjacent part of the belt towards its longitudinal centre line. This is achieved for the direction of advancement of the belt indicated in Figure 1 by forming each of the rollers 23 with a right-hand helical groove and by forming each of the rollers 22 with a left-hand helical groove.

In the particular arrangement illustrated each of the centre rollers 21 is provided on each half thereof with helical grooves 28, 29 of opposite hand to one another and of the same unsymmetrical cross section as that of the grooves 25 so as to be provided respectively with relatively sharp edges 30, 31 on one side of each groove similar to the aforesaid sharp edges 27. The hand of the grooves 28 and the position of their sharp edge 30 in relation to the longitudinal centre line of the belt is similar to that of the grooves on the adjacent roller 22, while the grooves 29 are correspondingly disposed similarly to the grooves on the adjacent roller 23. The arrangement is such that the grooves on each half of the roller 21 operate in manner similar to the grooves on each roller 22 and 23.

As the periphery of each roller is formed of rubber there will necessarily be good frictional engagement between each groove edge 27, 30, 31 and the belt.

Each of the roller shafts 10 are held against movement along their length relative to the supporting base plate 24 by the provision of the nuts 15 at each end of each shaft 10, while the members 4 of the rollers themselves are in turn held against axial movement in relation to the shaft 10 through the medium of the bearings 11 as will be apparent from Figure 3 so that each roller is fully held against movement in a direction laterally of the belt.

Furthermore, each shaft 10 is of rigid construction with its two ends in alignment with one another, the arrangement being such that under all conditions of operation each complete roller including the two ends thereof rotates about a single axis extending parallel to the length of the associated shaft.

Each wall member 4 by being formed in rubber is necessarily formed of an elastic resilient material so that it is adapted to be deformed inwardly temporarily under the impact of the received load so as thereby to absorb resiliently such impact, instead of the same being transmitted to the belt 5 to a degree sufficient to damage the belt.

Such impact absorbing characteristics of each wall member 4 are assisted by the annular space 9 within the interior thereof being sealed as above described from the surrounding atmosphere so that this annular air space acts as a pneumatic air cushion in assisting the wall member 4 in absorbing gravitationally delivered load impacts on the belt. Such hollow wall member 4 as already described is of comparatively substantial radial thickness sufficient to preclude deformation thereof on to the sleeve 8 despite the absence of special pressure inflation of the annular air space 9.

If the wall member 4 were deformed inwardly sufficient to engage under the load impact with the sleeve 8 there would be a danger of part of the impact being transmitted to the belt to a degree sufficient to damage it and this is avoided by making the wall thickness of the member 4 relatively substantial as already described and by providing in addition the sealed annular air space between the member 4 and the sleeve 8.

Since the annular air space 9 is not specially inflated to a pressure above that of the surrounding atmosphere there is no necessity with the arrangement above described to inflate the interior of each roller periodically in order to maintain the air pressure therein at a predetermined value as might be required for its efficient operation so that the present arrangement is eminently suitable for use in coal mines and other places where unduly frequent maintenance operations are likely to be inconvenient.

What I claim then is:

1. In an idler roller for use in supporting the load carrying run of an endless flexible belt conveyor at a load receiving position, the provision of a hollow tubular wall member, a rigid shaft of straight configuration throughout its entire length extending through the interior of said member and projecting beyond opposite ends thereof, a supporting member extending within the interior of the wall member at each end thereof only, and supporting said wall member at its two ends only from said shaft, said wall member intermediate its two ends being formed solely of a non-metallic elastic resilient material which is itself inherently adapted to permit of the wall member being deformed inwardly of the roller under the impact of an external load and to permit of said wall member returning to its initial shape on removal of the load, the hollow interior of the wall member being sealed from the surrounding atmosphere without being specially pressure inflated so that an annular enclosed air space is provided adjacent the interior of said wall member adapted to assist the same in absorbing gravitationally delivered load impacts, said wall member being of sufficient radial thickness as to preclude deformation thereof under such impacts on to any rigid part within the interior thereof despite the absence of special pressure inflation of said annular air space, and bearing means at each end of said roller supporting the two ends thereof for rotation about a common axis co-axial with the central axis of said shaft.

2. An idler roller for use in supporting the load carrying run of an endless flexible belt conveyor at a load receiving position, said roller comprising a hollow wall member mounted on a rigid shaft of straight configuration throughout its entire length extending through the interior of said member between opposite ends thereof, a supporting member extending within the interior of the wall member at each end thereof only, each of said wall member ends being mounted on the adjacent supporting member so as to be supported by the same, a bearing between each supporting member and said shaft, each of said bearings supporting the corresponding end of said roller for rotation about a common axis co-axial with the central axis of said shaft, said wall member intermediate its two ends being formed solely of a non-metallic elastic resilient material which is itself inherently adapted to permit of the wall member being deformed inwardly of the roller under the impact of an external load and to permit of said wall member returning to its initial shape on removal of the load, the hollow interior of the wall member being sealed from the surrounding atmosphere without being specially pressure inflated so that an annular enclosed air space is provided adjacent the interior of said wall member adapted to assist the same in absorbing gravitationally delivered load impacts, said wall member being of sufficient radial thickness as to preclude deformation thereof under such impacts on to any rigid part within the interior thereof despite the absence of special pressure inflation of said annular air space.

3. An idler roller for use in supporting the load carrying run of an endless flexible belt conveyor at a load receiving position, said roller comprising a hollow wall member mounted on a rigid shaft extending through the interior of said member between opposite ends thereof, said wall member being internally and externally of cylindrical form throughout its entire length, a bush extending within the interior of the wall member at each end thereof only, said bush being of cylindrical form peripherally and being in direct air tight engagement with the cylindrical interior of the wall member end, each of said bushes having their bores formed intermediate their ends with an outwardly directed recess, a bearing housed within each of said recesses between each bush and said shaft and supporting the two ends of said wall member for rotation about a common axis co-axial with the central axis of said shaft, said wall member intermediate its two ends being formed solely of a non-metallic elastic resilient material which is itself inherently adapted to permit of the wall member being deformed inwardly of the roller under the impact of an external load and to permit of said wall member returning to its initial shape on removal of the load, a cylindrical sleeve in airtight connection with each of said bushes extending between said two bushes around said roller shaft spaced from the periphery thereof so as to provide within said sleeve an annular lubricant receiving space for said bearings, said bushes and said sleeve sealing the hollow interior of said wall member from the surrounding atmosphere without said interior being specially pressure inflated so that an annular enclosed air space is provided adjacent the interior of said wall member adapted to assist the same in absorbing gravitationally delivered load impacts, said wall member being of sufficient radial thickness as to preclude deformation thereof under such impacts on to any rigid part within the interior thereof despite the absence of special pressure inflation of said annular air space.

4. An idler roller for use in supporting the load carrying run of an endless flexible belt conveyor at a load receiving position, said roller comprising a hollow tubular wall member, a rigid shaft extending through said wall member and projecting beyond opposite ends thereof, a bush extending within the interior of the wall member at each end thereof only, a bearing supporting each bush rotatably from said shaft, said wall member intermediate its two ends being formed solely of a non-metallic elastic resilient material which is itself inherently adapted to permit of the wall member being deformed inwardly of the roller under the impact of an external load and to permit of said wall member returning to its initial shape on removal of the load, the hollow interior of the wall member being sealed from the surrounding atmosphere without being specially pressure inflated so that an annular enclosed air space is provided adjacent the interior of said wall member adapted to assist the same in absorbing gravitationally delivered load impacts, said wall member being of sufficient radial thickness as to preclude deformation thereof under such impacts on to any rigid part within the interior thereof despite the absence of special pressure inflation of said annular air space, an annular reinforcing member disposed within each end only of the wall member and between the inner and outer peripheries thereof, said reinforcing member extending around the adjacent bush so that a resilient shock absorbing cushion is provided by the material of each wall member between each wall member and the adjacent bush and between such reinforcing member and the outer periphery of said wall member.

5. An idler roller for use in supportinig the load carrying run of an endless flexible belt conveyor at a load receiving position, said roller comprising a hollow tubular wall member, a rigid shaft extending through said wall member and projecting beyond opposite ends thereof, a bush extending within the interior of the wall member at each end thereof only, a bearing supporting each bush rotatably from said shaft, said wall member intermediate its two ends being formed solely of a non-metallic elastic resilient material which is itself inherently adapted to permit of the wall member being deformed inwardly of the roller under the impact of an external load and to permit of said wall member returning to its initial shape on removal of the load, the hollow interior of the wall member being sealed from the surrounding atmosphere without being specially pressure inflated so that an annular enclosed air space is provided adjacent the interior of said wall member adapted to assist the same in absorbing gravitationally delivered load impacts, said wall member being of sufficient radial thickness as to preclude deformation thereof under such impacts on to any rigid part within the interior thereof despite the absence of special pressure inflation of said annular air space, an annular reinforcing member disposed within each end only of the wall member and between the inner and outer peripheries thereof, said reinforcing member extending around the adjacent bush so that a resilient shock absorbing cushion is provided by the material of each wall member between each wall member and the adjacent bush and between such reinforcing member and the outer periphery of said wall member, a cap threadably mounted within the interior of the outer end of each of said bushes, a peripheral flange on the outer end of each of said caps, said peripheral flange engaging with the outer end of the adjacent annular reinforcing member to retain said reinforcing member within said wall member end.

6. In an idler roller for use in supporting the load carrying run of an endless flexible belt conveyor at a load receiving position, the provision of a hollow tubular wall member formed of elastic rubber material so that it is adapted to be deformed inwardly temporarily under the impact of the received load, a rigid shaft of straight configuration throughout its entire length extending through the interior of said member and projecting beyond opposite ends thereof, a supporting member extending within the interior of the wall member at each end thereof only, and supporting said wall member at its two ends only from said shaft, said wall member being bonded to each of said supporting members so as to provide therebetween an air tight joint and having its hollow interior sealed from the surrounding atmosphere without being specially pressure inflated so that an annular enclosed air space is provided adjacent the interior of said wall member adapted to assist the same in absorbing gravitationally delivered load impacts, said wall member being of sufficient radial thickness as to preclude deformation thereof under such impacts on to any rigid part within the interior thereof despite the absence of special pressure inflation of said annular air space, and bearing means at each end of said roller supporting the two ends thereof for rotation about a common axis co-axial with the central axis of said shaft.

References Cited in the file of this patent
UNITED STATES PATENTS

| | | |
|---|---|---|
| 1,803,357 | Robins | May 5, 1931 |
| 1,980,777 | Zollinger | Nov. 13, 1934 |
| 2,007,910 | Stephens | July 9, 1935 |
| 2,277,402 | Hoeck | Mar. 24, 1942 |
| 2,568,174 | Staacke | Sept. 18, 1951 |
| 2,592,581 | Lorig | Apr. 15, 1952 |

FOREIGN PATENTS

| | | |
|---|---|---|
| 849,649 | France | Aug. 21, 1939 |